(12) United States Patent
Mori et al.

(10) Patent No.: US 10,456,869 B2
(45) Date of Patent: Oct. 29, 2019

(54) LASER PROCESSING DEVICE HAVING PREPROCESSING CONTROLLER AND LASER PROCESSING METHOD

(71) Applicant: FANUC CORPORATION, Yamanashi (JP)

(72) Inventors: Atsushi Mori, Yamanashi (JP); Takashi Izumi, Yamanashi (JP); Akinori Ohyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 160 days.

(21) Appl. No.: 15/467,403

(22) Filed: Mar. 23, 2017

(65) Prior Publication Data
US 2017/0282300 A1 Oct. 5, 2017

(30) Foreign Application Priority Data
Mar. 30, 2016 (JP) .................. 2016-069330

(51) Int. Cl.
 *B23K 26/60* (2014.01)
 *B23K 26/70* (2014.01)
 *B23K 26/03* (2006.01)

(52) U.S. Cl.
 CPC .......... *B23K 26/705* (2015.10); *B23K 26/032* (2013.01); *B23K 26/60* (2015.10)

(58) Field of Classification Search
 CPC ...... B23K 26/00; B23K 26/60; B23K 26/032; B23K 26/705; B23K 26/02; B23K 26/428; B23K 26/0626; B23K 26/0807
 (Continued)

(56) References Cited

U.S. PATENT DOCUMENTS 5,841,099 A * 11/1998 Owen .................. C23C 14/046
 219/121.69
8,624,153 B2 1/2014 Atsumi et al.
(Continued)

FOREIGN PATENT DOCUMENTS

CN 1902023 A 1/2007
CN 104066543 A 9/2014
(Continued)

OTHER PUBLICATIONS

Decision to Grant a Patent issued in Japanese Application No. 2016-069330 dated Jan. 23, 2018, 3 pages.
(Continued)

*Primary Examiner* — Dana Ross
*Assistant Examiner* — Ayub A Maye
(74) *Attorney, Agent, or Firm* — RatnerPrestia (57) ABSTRACT

A laser processing device has a preprocessing controller which issues a command to perform preprocessing of a workpiece under high output conditions, which are previously found by an experiment or calculation in accordance with at least some of processing conditions and which include the irradiation intensity and irradiation time, at which a workpiece is melted, changed in shape, or denatured; a command to irradiate the workpiece with a laser beam under low output conditions, which are previously found by an experiment or calculation in accordance with at least some of the processing conditions and which include the irradiation intensity and irradiation time, at which a workpiece is not melted, changed in shape, or denatured; and a command of whether to start the laser processing, based on a first light quantity of light reflected or emitted from a processing point irradiated with a laser beam under the low output conditions.

4 Claims, 9 Drawing Sheets

(58) Field of Classification Search
USPC .............. 219/121.6, 121.61, 121.62, 121.63, 219/121.73, 121.85, 121.83
See application file for complete search history.

(56) References Cited

U.S. PATENT DOCUMENTS

| | | | |
|---|---|---|---|
| 2006/0131289 A1* | 6/2006 | Jyumonji | B23K 26/03 219/121.83 |
| 2008/0055588 A1* | 3/2008 | Nomaru | B23K 26/03 356/73 |
| 2009/0066969 A1* | 3/2009 | Sawabe | G01B 11/0608 356/614 |
| 2013/0218321 A1 | 8/2013 | Miyamoto et al. | |
| 2014/0083986 A1 | 3/2014 | Zhang et al. | |
| 2015/0021303 A1 | 1/2015 | Funaki et al. | |
| 2015/0092182 A1* | 4/2015 | Kumagai | G01B 11/14 356/4.01 |

FOREIGN PATENT DOCUMENTS

| | | |
|---|---|---|
| CN | 104703748 A | 6/2015 |
| JP | H02179376 A | 7/1990 |
| JP | H02179377 A | 7/1990 |
| JP | 2004058141 A | 2/2004 |
| JP | 2004-074253 A | 3/2004 |
| JP | 2006238195 A | 9/2006 |
| JP | 2011083779 A | 4/2011 |
| JP | 2013146752 A | 8/2013 |
| JP | 2014-117730 A | 6/2014 |
| JP | 2017131937 A | 8/2017 |
| WO | WO 2013/014994 A1 | 1/2013 |

OTHER PUBLICATIONS

Chinese Office Action for Chinese Application No. 201710059056.8, dated Jun. 13, 2018, with English translation, 10 pages.

* cited by examiner

LASER PROCESSING DEVICE HAVING PREPROCESSING CONTROLLER AND LASER PROCESSING METHOD

BACKGROUND OF THE INVENTION

1. Field of the Invention

The present invention relates to a laser processing device for performing preprocessing to avoid excessive return light to a laser oscillator, and a laser processing method.

2. Description of the Related Art

In laser processing, return light, which is excessively returned from the surface of a workpiece for a long time, causes optical systems of a laser oscillator and a laser processing device to break down in some cases. When the intensity of return light exceeds a predetermined threshold value, an alarm is raised to stop the laser oscillator, but a failure in processing occurs, and the operation rate reduces. Examples of a technology for avoiding such return light are publicly known in, for example, the following patent documents.

Japanese Unexamined Patent Publication (Kokai) No. 2014-117730 discloses that a workpiece is irradiated, as a preliminary processing operation, with a laser beam under piercing conditions, before laser processing, while a focal position is changed, so that a position, at which the intensity of return light is low, is stored, and a piecing operation (drilling operation) is performed at this position.

Japanese Patent No. 4174267 discloses that a workpiece is pulse-irradiated with a laser beam before piercing or cutting, and, when the measured value of return light exceeds a predetermined value, the pulse width of the laser beam is reduced.

WO 2013/014994 discloses that a workpiece is irradiated with a laser beam, and whether the specified processing conditions match with the workpiece is determined based on return light from the workpiece.

SUMMARY OF THE INVENTION

However, excessive return light may still be generated for a long time if, for example, melting, a change in shape, or denaturation does not rapidly occur in the surface of a workpiece, at the start of laser processing, by any cause.

Thus, a technology for causing melting, a change in shape, or denaturation to reliably occur in a workpiece at the start of laser processing, and for avoiding the occurrence of excessive return light for a long time during laser processing, has been demanded.

According to a first aspect of the present invention, there is provided a laser processing device having a laser oscillator, a storage unit configured to store a processing program and processing conditions, and a controller configured to issue a command to perform laser processing in accordance with the processing program, the laser processing device being configured to perform laser processing by irradiating a workpiece with a laser beam. The laser processing device includes a light quantity measuring unit configured to measure the light quantity of light reflected or emitted from a processing point irradiated with a laser beam, a first storage unit configured to store high output conditions, which are previously found by an experiment or calculation in accordance with at least some of the processing conditions and which include the irradiation intensity and irradiation time, at which a workpiece is melted, changed in shape, or denatured, a second storage unit configured to store low output conditions, which are previously found by an experiment or calculation in accordance with at least some of the processing conditions and which include the irradiation intensity and irradiation time, at which a workpiece is not melted, changed in shape, or denatured, and a preprocessing controller which issues a command to perform preprocessing of a workpiece under the high output conditions, and a command to irradiate the workpiece with a laser beam under the low output conditions and which issues a command of whether to start the laser processing, based on a first light quantity measured by the light quantity measuring unit after the workpiece is irradiated with a laser beam under the low output conditions.

According to a second aspect of the present invention, the laser processing device according to the first aspect further includes a third storage unit configured to store a first light quantity measured by the light quantity measuring unit after a workpiece is irradiated with a laser beam under the low output conditions, a fourth storage unit configured to store a second light quantity measured by the light quantity measuring unit after a workpiece is irradiated with a laser beam under the low output conditions before a command to perform preprocessing of the workpiece is issued under the high output conditions, and a fifth storage unit configured to store a light quantity reference value by which whether to start laser processing is determined. The preprocessing controller issues a command to irradiate a workpiece with a laser beam under the low output conditions before issuing a command to perform preprocessing of the workpiece under the high output conditions, and issues a command of whether to perform the laser processing, based on the first light quantity, the second light quantity, and the reference value.

According to a third aspect of the present invention, in the laser processing device according to the first or second aspect, the light quantity measuring unit is provided in the laser oscillator, and measures the light quantity of return light returned from the workpiece to the laser oscillator. The light quantity of return light measured by the light quantity measuring unit after the workpiece is irradiated with a laser beam under the high output conditions and the low output conditions is limited by a limit value specified to limit (a) the peak value of the intensity of the return light, (b) the average value of the intensity of the return light per predetermined time, (c) the number of times the peak value of the intensity of the return light exceeds a limit value within a predetermined time, or (d) the heat quantity of return light per pulse output.

According to a fourth aspect of the present invention, in the laser processing device according to the third aspect, the limit value of return light includes the limit value of the light quantity of return light and the limit value of the duration of return light. The limit value of the light quantity of return light in the high output conditions is greater than the limit value of the light quantity of return light in the low output conditions, and the limit value of the duration of return light in the high output conditions is smaller than the limit value of the duration of return light in the low output conditions.

According to a fifth aspect of the present invention, there is provided a laser processing method performed by a laser processing device having a laser oscillator, a storage unit configured to store a processing program and processing conditions, a controller configured to issue a command to perform laser processing in accordance with the processing program, and a light quantity measuring unit configured to measure the light quantity of light reflected or emitted from a processing point irradiated with a laser beam, the laser processing device being configured to perform laser processing by irradiating a workpiece with a laser beam. The lase processing method includes a step of performing preprocessing of a workpiece under high output conditions, which are previously found by an experiment or calculation in accordance with at least some of the processing conditions and which include the irradiation intensity and irradiation time, at which the workpiece is melted, changed in shape, or denatured, a step of irradiating a workpiece with a laser beam under low output conditions, which are previously found by an experiment or calculation in accordance with at least some of the processing conditions and which include the irradiation intensity and irradiation time, at which the workpiece is not melted, changed in shape, or denatured, and a step of issuing a command of whether to start the laser processing, based on a first light quantity measured by the light quantity measuring unit after the workpiece is irradiated with a laser beam under the low output conditions.

DETAILED DESCRIPTION

Embodiments of the present invention will be described below in detail with reference to the accompanying drawings. In the figures, similar components are designated by the same reference numerals. Note that the contents described below do not limit the technical scope of the inventions described in claims and the meaning of terms.

First Embodiment

Figure 1:
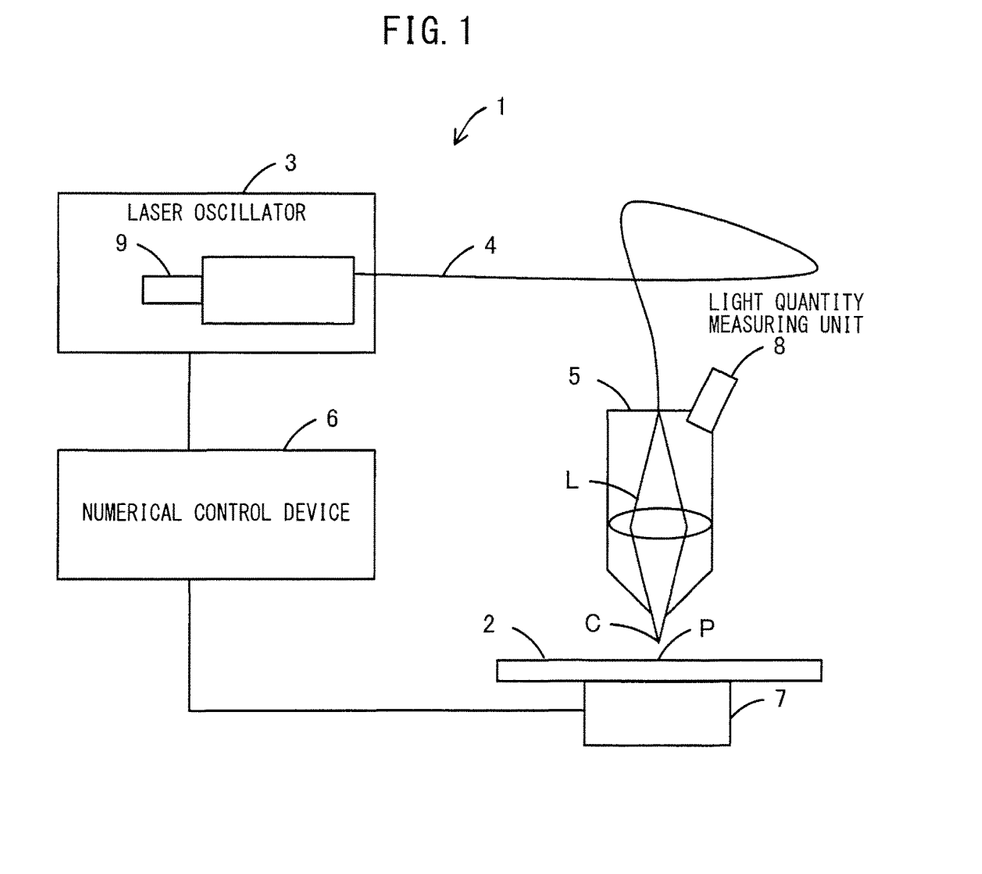
FIG. 1 is a schematic view of the configuration of a laser processing device according to a first embodiment of the present invention.
Figure 2:
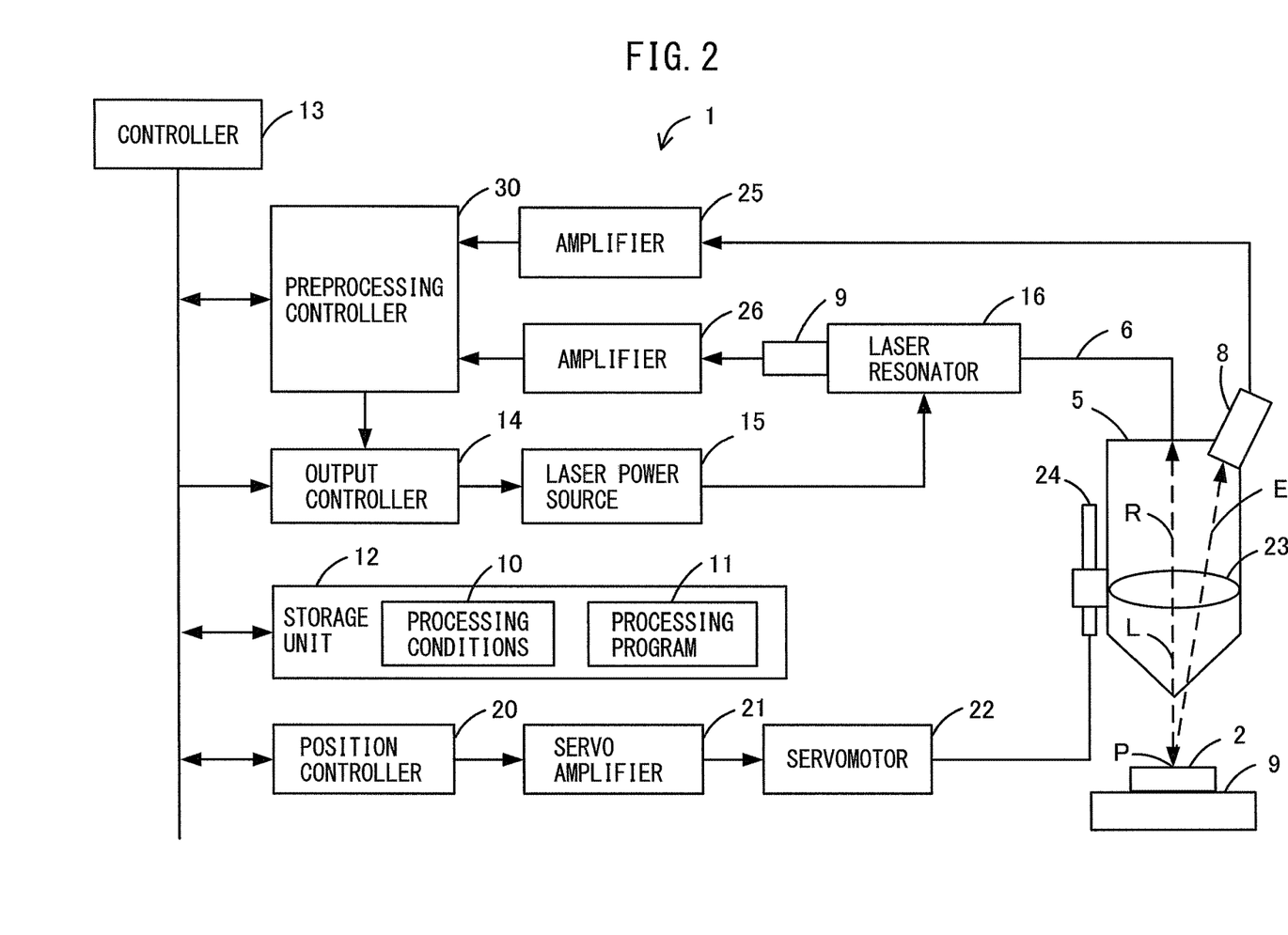
FIG. 2 is a block diagram of the laser processing device according to the first embodiment.

With reference to FIGS. 1 and 2, the configuration of a laser processing device in a first embodiment of the present invention will be described. FIG. 1 is a schematic view of the laser processing device in the first embodiment. A laser processing device 1 performs preprocessing of a workpiece 2 made of metal or non-metal, to reduce return light returned to a laser oscillator 3, and confirms that the surface of the workpiece 2 is melted, changed in shape, or denatured to the extent that the return light reduces before starting laser processing, such as piercing, cutting, welding, marking, etc. The laser processing device 1 has the laser oscillator 3, an optical fiber 4, a processing head 5, a numerical control device 6, a mechanism controller 7, a light quantity measuring unit 8 provided in the processing head 5, and a light quantity measuring unit 9 provided in the laser oscillator 3.

FIG. 2 is a block diagram of the laser processing device in the first embodiment. The laser processing device 1 has a storage unit 12 configured to store processing conditions 10 and a processing program 11, and a controller 13 configured to control the entirety of the laser processing device 1 in accordance with the processing program 11. The storage unit 12 is comprised of a memory, such as a RAM, a ROM, etc., and the controller 13 is comprised of a processor, such as a CPU, a MPU, etc. The controller 13 issues an output command of a laser beam to an output controller 14 in accordance with the processing conditions 10, and the output controller 14 issues a pulse command generated in accordance with the output command to a laser power source 15. The laser power source 15 supplies electric powers generated in accordance with the pulse command to an excitation laser power source, to supply an excitation laser beam to a laser resonator 16. The laser resonator 16 is resonated by the excitation laser beam, to emit a laser beam L.

The controller 13 issues, in accordance with the processing conditions 10, a position command regarding the position of the workpiece 2 with respect to the processing head 5 to a position controller 20. The position controller 20 issues a pulse command generated in accordance with the position command to a servo amplifier 21. The servo amplifier 21 supplies a drive signal generated by multiplying the pulse command by a feedback pulse to a servomotor 22. The servomotor 22 rotates a B-axis 24 configured to change the position of a collecting lens 23 of the processing head 5 (i.e., the position of a light collecting point C in FIG. 1). The laser processing device 1 is provided with position controllers for X-, Y-, and Z-axes, servo amplifiers for X-, Y-, and Z-axes, and servomotors for X-, Y-, and Z-axes, but they are not illustrated.

Figure 3:
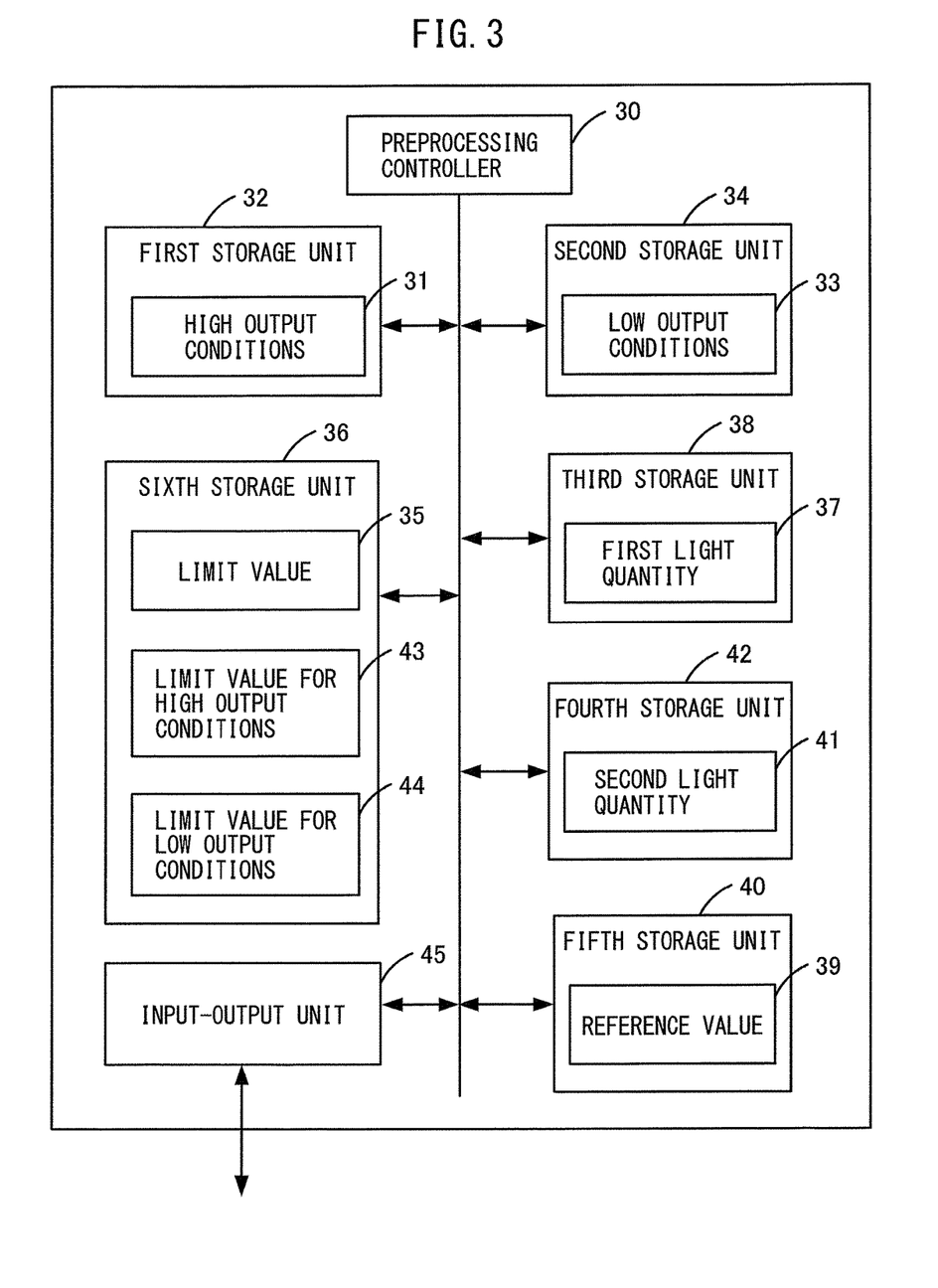
FIG. 3 is a block diagram of a preprocessing controller according to the first embodiment.

The laser processing device 1 has a preprocessing controller 30 configured to control preprocessing to cause melting, a change in shape, or denaturation of a workpiece, to reduce return light R returned to the laser oscillator 3 during laser processing. The preprocessing controller 30 is comprised of, but is not limited to, an integrated circuit, such as an ASIC, an FPGA, etc., and, in another embodiment, is configured as a preprocessing program read out from the storage unit 12 and executed in the controller 13. FIG. 3 is a block diagram of the preprocessing controller in the first embodiment. The preprocessing controller 30 issues an output command for preprocessing the workpiece 2 under high output conditions 31, under which a workpiece is melted, changed in shape, or denatured, to reduce the light quantity of the return light R during laser processing to a value not greater than a limit value 35 specified for each laser oscillator, and also issues an output command for irradiating the workpiece 2 with a laser beam under low output conditions 33, to confirm that the preprocessing sufficiently causes melting, a change in shape, or denaturation in the surface of the workpiece 2. These output commands are output to the output controller 14 shown in FIG. 2 via an input-output unit 45.

As shown in FIG. 2, the light quantities of light beams E and R, which are reflected or emitted from a processing point P after the workpiece 2 is irradiated with a laser beam under low output conditions, are respectively measured by the light quantity measuring unit 8 provided in the processing head 5 and the light quantity measuring unit 9 provided in the laser resonator 16. The light quantities measured by the light quantity measuring units 8 and 9 are respectively amplified by amplifiers 25 and 26, and are input to the preprocessing controller 30. The light quantities measured by the light quantity measuring units 8 and 9 after preprocessing are stored, as a first light quantity 37, in the third storage unit 38 via the input-output unit 45, as shown in FIG. 3. The preprocessing controller 30 confirms whether the surface of the workpiece 2 is sufficiently melted, changed in shape, or denatured to the extent that the return light R during laser processing can be reduced to the limit value 35 or less based on the first light quantity 37, and issues a command of whether to start laser processing.

When the preprocessing sufficiently causes melting, a change in shape, or denaturation in the surface of the workpiece 2 to the extent that the return light during laser processing can be reduced to the limit value 35 or less, the first light quantity 37 is equal to or less than a reference value 39. The reference value 39 is previously found by an experiment or calculation, and is stored in a fifth storage unit 40. When the first light quantity 37 is equal to or less than the reference value 39, the preprocessing controller 30 issues a command for starting laser processing to the controller 13 shown in FIG. 2 via the input-output unit 45. When the first light quantity 37 exceeds the reference value 39, the preprocessing controller 30 does not perform laser processing, and issues an output command for performing preprocessing again under the high output conditions 31. The preprocessing controller 30 repeatedly issues the output command for performing preprocessing until the first light quantity 37 reaches the reference value 39 or less.

The high output conditions 31 and the low output conditions 33 will now be described in further detail. The high output conditions 31 are output conditions for performing preprocessing, and accordingly, include the irradiation intensity and irradiation time, which cause melting, a change in shape, or denaturation of the workpiece 2, but prevent the return light R returned to the laser oscillator 3 from damaging the laser processing device 1. In other words, the high output conditions 31 are output conditions under which a drastically high output is used to alter the workpiece 2 in an instant. In contrast, the low output conditions 33 are output conditions for confirming whether the surface of the workpiece 2 is melted, changed in shape, or denatured to the extent that the return light R during laser processing can be reduced to the limit value 35 or less, and accordingly, include the irradiation intensity and irradiation time, which do not cause melting, a change in shape, or denaturation of the workpiece 2, and prevent the return light returned to the laser oscillator 3 from damaging the laser processing device 1. In other words, the low output conditions 33 are output conditions, under which an extremely small output is used not to exert an effect on the workpiece 2 or the laser processing device 1. The high output conditions 31 and the low output conditions 33 are previously found by an experiment or calculation in accordance with at least some of the processing conditions 10 used for laser processing, and are stored in a first storage unit 32 and a second storage unit 34 in accordance with the processing conditions.

An example of the method for finding the high output conditions 31 and the low output conditions 33 will be described. First, at least some of the processing conditions 10, i.e., the material of the workpiece 2, the state of the surface of the workpiece 2, the wavelength of a laser beam, the incidence angle of a laser beam with respect to the workpiece 2, the polarization property of a laser beam, the beam diameter of a laser, beam, etc. are determined. The laser processing device 1 is prepared so as to have characteristics, for example, stainless steel SUS304, mirror finish, antirust oil coating, a laser beam having a wavelength of 1.06 μm, vertical incidence, random polarization, and a beam diameter of 1000 μm.

Subsequently, in order to find the high output conditions 31, an experiment for irradiating the workpiece 2 with a laser beam is repeatedly performed while the irradiation intensity and irradiation time are changed. Then the irradiation intensity and irradiation time, which cause melting, a change in shape, or denaturation of the workpiece 2, but prevent the return light R from damaging the laser processing device 1, are found. Consequently, the high output conditions 31 found in this example include laser power: 3000 W, frequency: 1000 Hz, duty: 20%, and irradiation time: 2 ms. Likewise, in order to find the low output conditions 33, an experiment for irradiating the workpiece 2 with a laser beam is repeatedly performed while the irradiation intensity and irradiation time are changed. Then the irradiation intensity and irradiation time, which do not cause melting, a change in shape, or denaturation of the workpiece 2, and prevent the return light R from damaging the laser oscillator 3, etc., are found. Consequently, the low output conditions 33 found in this example include laser power: 1000 W, continuous irradiation, and irradiation time: 8 ms.

Figure 4:
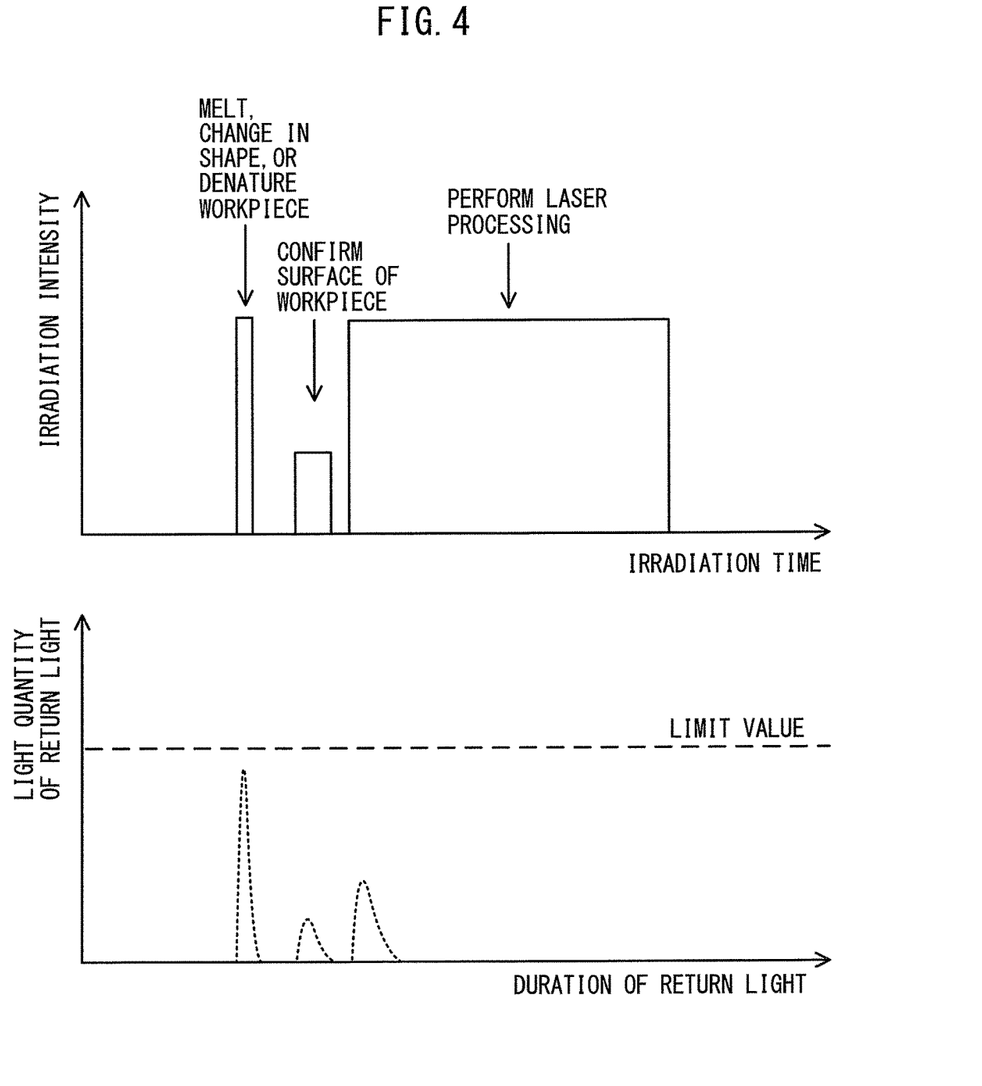
FIG. 4 is a graph of the relationship between the irradiation intensity and the light quantity of return light in the first embodiment.

Note that, in order to prevent the return light R from damaging the laser processing device 1, the light quantity of the return light R in the high output conditions 31 and the low output conditions 33 is limited to the limit value 35 or less specified for each laser oscillator. FIG. 4 is a graph of the relationship between the irradiation intensity and the light quantity of return light in the first embodiment. The limit value shown in FIG. 4 is set for limiting the peak value of the intensity of return light, but is not limited to this. Examples of the limit value include a value set for limiting the average value of the intensity of return light per predetermined time, a value set for limiting the number of times the peak value of the intensity of return light per predetermined time exceeds the limit value, or a value set for limiting the heat quantity of return light per pulse.

Figure 5:
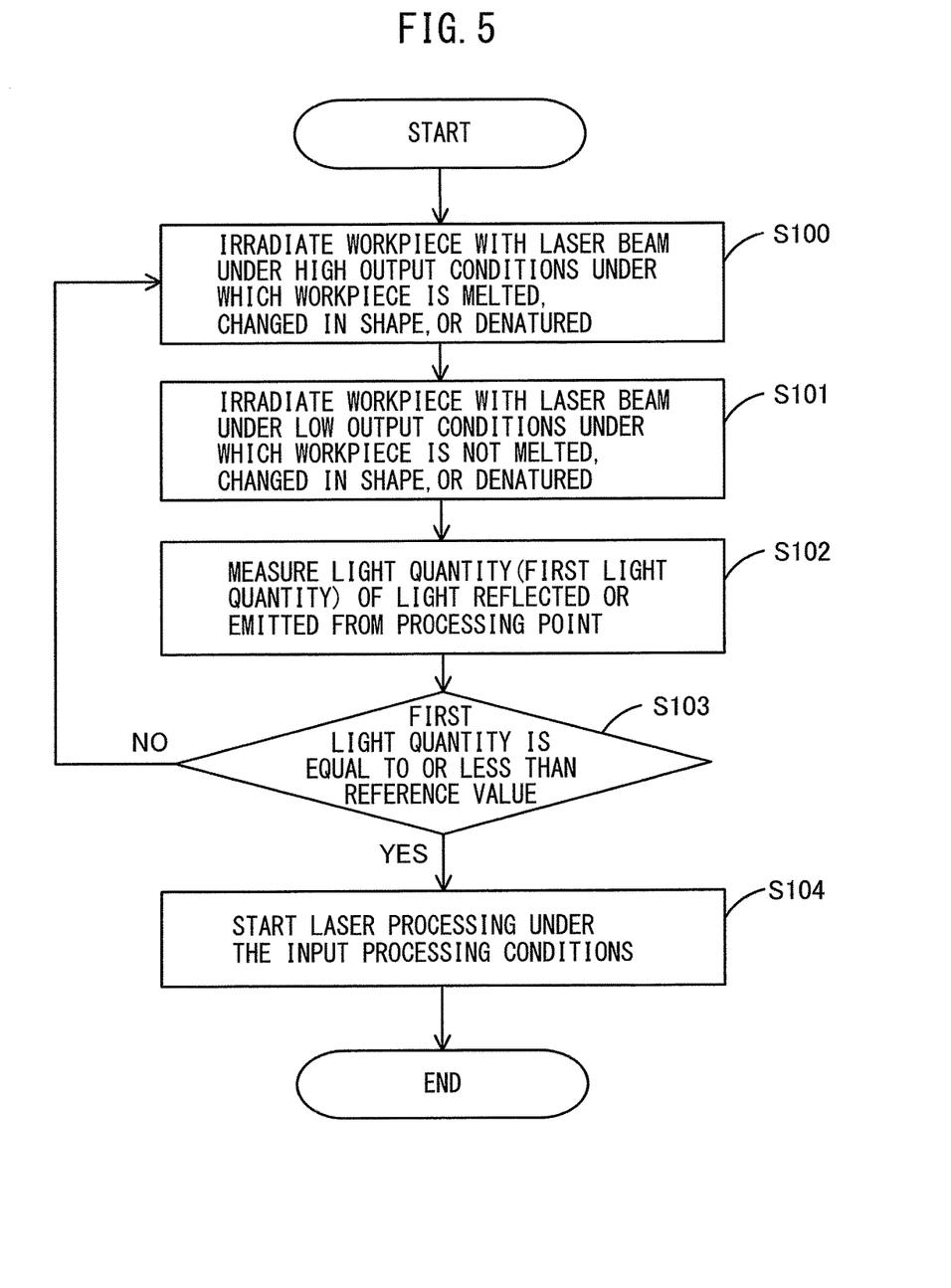
FIG. 5 is a flowchart of a laser processing method according to the first embodiment.
Figure 6:
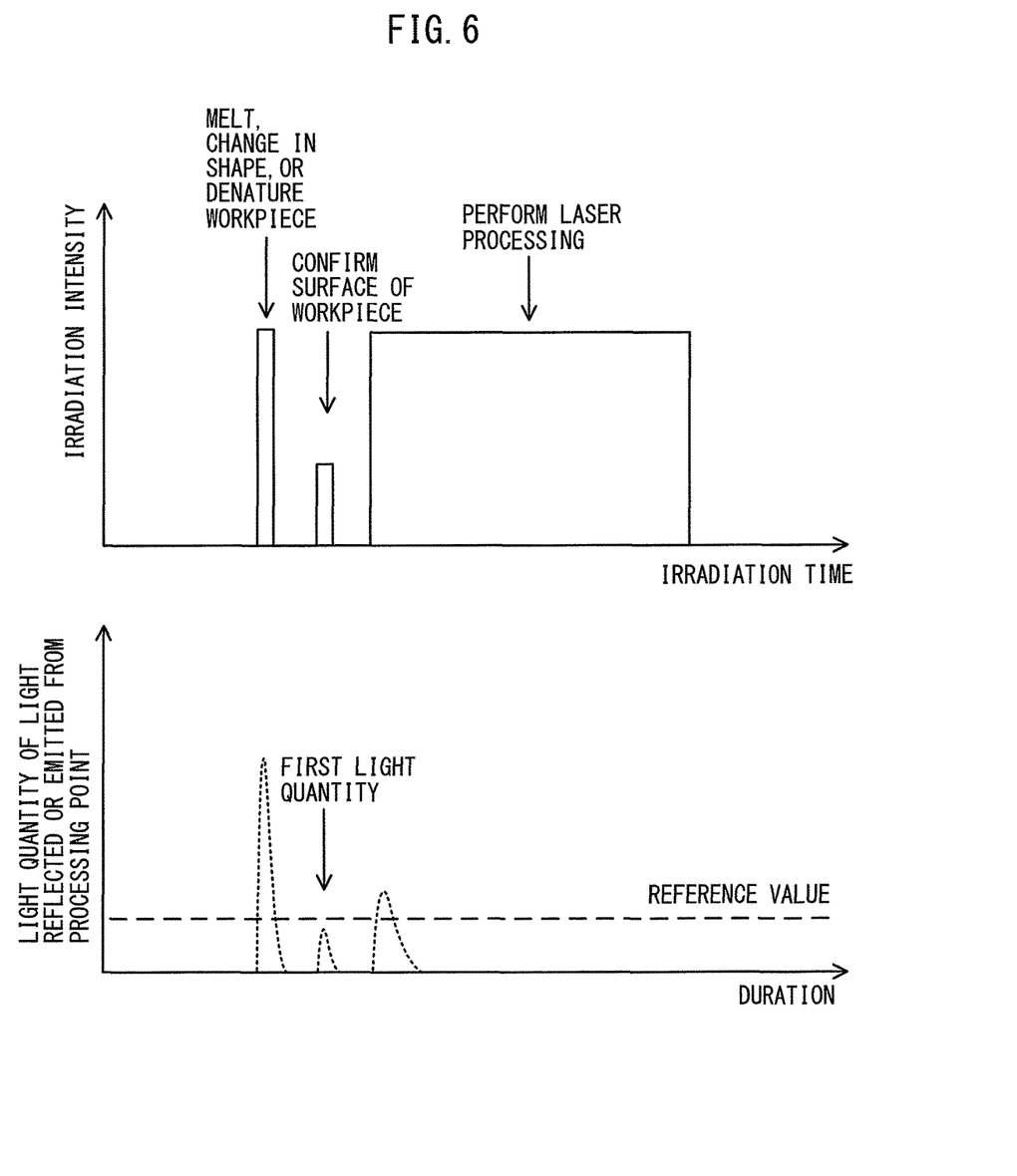
FIG. 6 is a graph of the relationship between the irradiation intensity and the light quantity of return light or emitted light from a processing point in the first embodiment.

With reference to FIGS. 5 and 6, the laser processing method in the first embodiment will now be described. FIG. 5 is a flowchart of the laser processing method in the first embodiment. FIG. 6 is a graph of the relationship between the irradiation intensity and the light quantity of reflected light or emitted light from a processing point in the first embodiment. The laser processing method shown in FIG. 5 is performed by a command from the preprocessing controller 30 shown in FIG. 2. First, in step S100, in order to reduce return light during laser processing, a laser beam is emitted under high output conditions including the irradiation intensity and irradiation time, which cause melting, a change in shape, or denaturation of a workpiece, but prevent the return light returned to the laser oscillator from damaging the laser processing device. FIG. 5 shows the irradiation intensity used to cause melting, a change in shape, or denaturation of a workpiece in step S100 and the light quantity of reflected light or emitted light from a processing point.

Next, in step S101, in order to confirm whether the surface of the workpiece 2 is sufficiently melted, changed in shape, or denatured to the extent that the return light during laser processing can be reduced, a laser beam is emitted under low output conditions including the irradiation intensity and irradiation time, which do not cause melting, a change in shape, or denaturation of the workpiece, but prevent the return light returned to the laser oscillator from damaging the laser processing device. Subsequently, in step S102, the light quantity (first light quantity) of reflected light or emitted light from a processing point is measured. FIG. 5 shows the irradiation intensity used to confirm the surface of the workpiece in step S101, and the first light quantity.

Subsequently, in step S103, whether the first light quantity is not greater than a reference value is determined. As shown in FIG. 5, when the first light quantity is not greater than the reference value (YES in step S103), the workpiece is sufficiently melted, changed in shape, or denatured to the extent that the return light during laser processing can be reduced to the limit value or less, and accordingly, in step S104, laser processing starts under the input processing conditions 10. In contrast, when the first light quantity exceeds the reference value (NO in step S103), the process returns to step S100, and preprocessing is performed again. The preprocessing is repeatedly performed until the first light quantity reaches the reference value or less.

Second Embodiment

Figure 7:
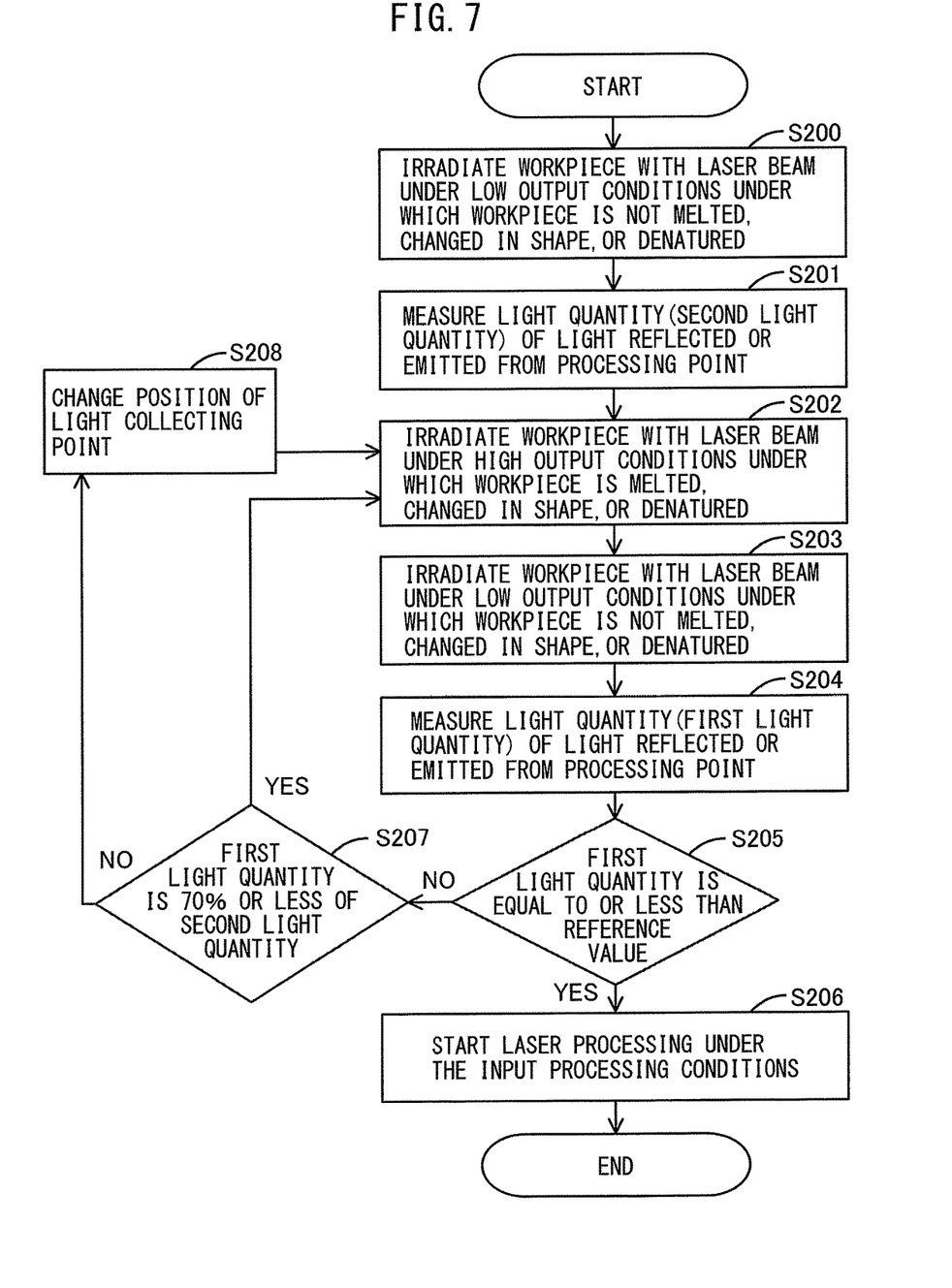
FIG. 7 is a flowchart of a laser processing method according to a second embodiment.
Figure 8:
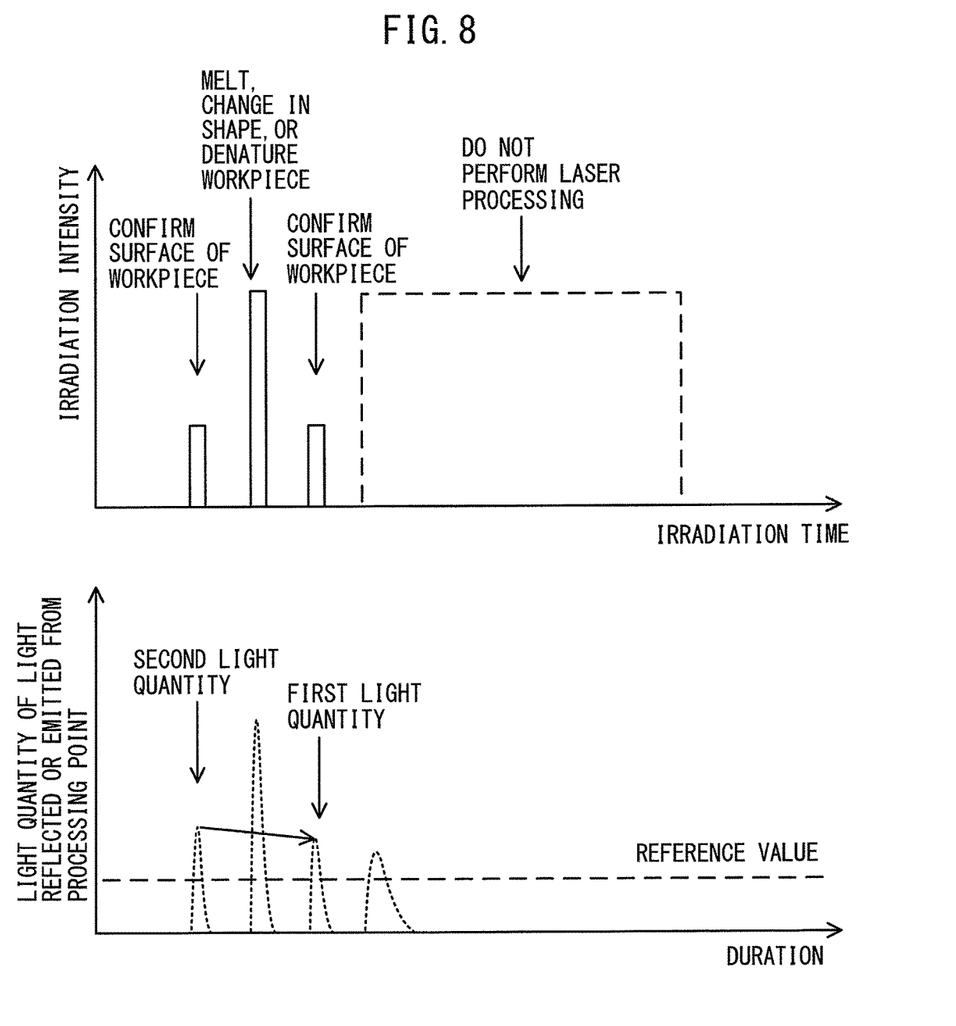
FIG. 8 is a graph of the relationship between the irradiation intensity and the light quantity of return light or emitted light from a processing point in the second embodiment.

With reference to FIGS. 7 and 8, the laser processing method in a second embodiment of the present invention will be described. FIG. 7 is a flowchart of the laser processing method in the second embodiment. FIG. 8 is a graph of the relationship between the irradiation intensity in the second embodiment and the light quantity of reflected light or emitted light from a processing point. The laser processing method shown in FIG. 7 is performed by a command from the preprocessing controller 30 shown in FIG. 2. In the laser processing method in the second embodiment, the light quantity (second light quantity) of reflected light or emitted light from a processing point is measured before preprocessing, to determine whether the workpiece can be melted, changed in shape, or denatured based on the first light quantity and the second light quantity, and, when the workpiece is seldom or never melted, changed in shape, or denatured, the position of a light collecting point with respect to the workpiece is changed, and preprocessing is performed again.

First, in step S200, in order to confirm the state of the surface of the workpiece before preprocessing, a laser beam is emitted under low output conditions, which do not cause melting, a change in shape, or denaturation of the workpiece, and prevent the return light returned to the laser oscillator from damaging the laser processing device. Subsequently, in step S201, the light quantity (second light quantity) of reflected light or emitted light from a processing point before preprocessing is measured. FIG. 8 shows the irradiation intensity used to confirm the state of the surface of the workpiece in step S200, and the second light quantity. The light quantities measured by the light quantity measuring units 8 and 9 before preprocessing are stored, as a second light quantity 41, in a fourth storage unit 42 shown in FIG. 3.

Subsequently, in steps S202 to S204, preprocessing is performed as in the first embodiment, and the first light quantity after preprocessing is measured. When the first light quantity exceeds the reference value in step S205 (NO in step S205), whether the first light quantity is 70% or less of the second light quantity in step S207 is determined. When the first light quantity is 70% or less of the second light quantity (YES in step S207), the surface of the workpiece is not sufficiently melted, changed in shape, or denatured, but is melted, changed in shape, or denatured to a certain extent, and accordingly, preprocessing is performed again in step S202. In contrast, when the first light quantity is greater than 70% of the second light quantity (NO in step S207), the surface of the workpiece is seldom or never melted, changed in shape, or denatured, and accordingly, the position of the light collecting point with respect to the workpiece is changed in step S208. FIG. 8 shows the irradiation intensity when the surface of the workpiece is seldom or never melted, changed in shape, or denatured, and the first light quantity. After the position of the light collecting point is moved downward in step S208, to improve the irradiation intensity, preprocessing is performed again in step S202.

When the first light quantity is equal to or less than the reference value in step S205 (YES in step S205), the workpiece is melted, changed in shape, or denatured to the extent that the light quantity of return light during laser processing can be reduced to the limit value or less, and accordingly, laser processing starts under the input processing conditions 10 in step S206.

Third Embodiment

Figure 9:
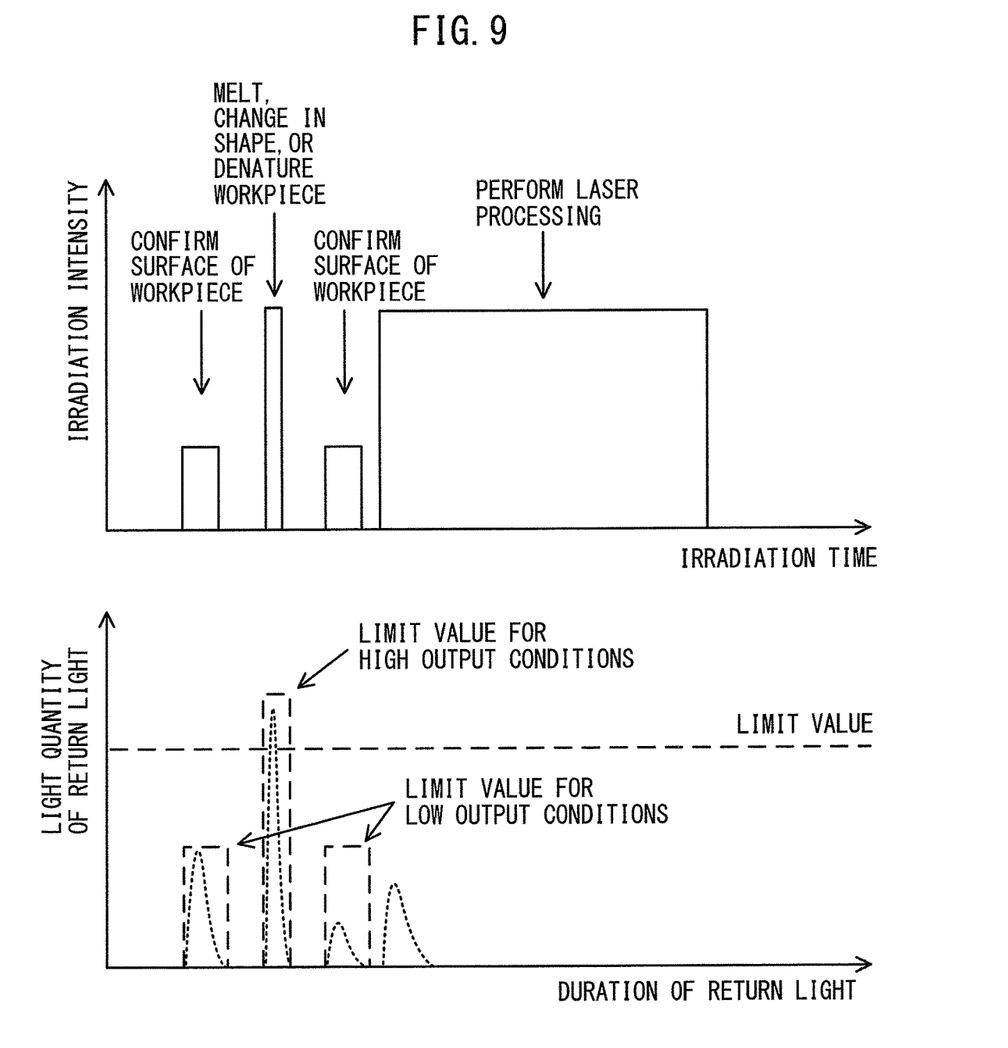
FIG. 9 is a graph of the relationship between the irradiation intensity and the limit value of return light in a third embodiment.

A method for finding the high output conditions and the low output conditions in a third embodiment of the present invention will now be described. FIG. 9 is a graph of the relationship between the irradiation intensity in the third embodiment and the light quantity of return light. In the third embodiment, when the high output conditions and the low output conditions are previously found by an experiment or calculation, the limit value for the high output conditions and the limit value for the low output conditions are used.

As shown in FIG. 9, the limit value for the high output conditions and the limit value for the low output conditions include the limit value for the light quantity of return light and the limit value of the duration of return light. The high output conditions are output conditions, under which a drastically high output is used to alter a workpiece in an instant, and accordingly, as shown in FIG. 9, the limit value of the light quantity of return light accepts a value exceeding the limit value of return light specified for each laser oscillator, but the limit value of the duration of return light is limited to an extremely short time, to avoid the damage of the laser processing device.

Likewise, the limit value for the low output conditions includes the limit value of the light quantity of return light and the limit value of the duration of return light. The low output conditions are output conditions, under which an extremely small output is used to exert no effect on the workpiece or the laser processing device, and the fact that the surface of the workpiece is sufficiently melted, changed in shape, or denatured is confirmed, and, as shown in FIG. 9, the limit value of the light quantity of return light is limited to a value much smaller than the limit value of return light specified for each laser oscillator, but the limit value of the duration of the return light R accepts a value relatively longer than the limit value for the high output conditions.

In other words, the limit value of the light quantity of return light in the high output conditions is greater than the limit value of the light quantity of return light in the low output conditions, but the limit value of the duration of return light in the high output conditions is smaller than the limit value of the duration of return light in the low output conditions.

The high output conditions and the low output conditions are previously found by an experiment or calculation so as to satisfy the limit value for the high output conditions and the limit value for the low output conditions described above. Note that, as shown in FIG. 3, a limit value 43 for the high output conditions and a limit value 44 for the low output conditions may be stored in a sixth storage unit 36.

The operational advantage of the present invention will now be described. The present invention enables stable and continuous laser processing because laser processing starts after the surface of the workpiece is altered by preprocessing. Further, laser processing starts after the alteration of the surface of the workpiece is confirmed, and accordingly, when the alteration of the surface of the workpiece is insufficient, the laser processing device can be protected without the damage of the optical system of the laser oscillator or the laser processing device, which may be caused by unexpected return light.

In other words, the present invention enables stable and continuous laser processing by avoiding excessive return light from the surface of the workpiece, which continues for a long time, and avoiding the stop caused by an alarm.

Note that the program in the above embodiments may be provided after being stored in a computer-readable non-temporary recording medium, e.g., CD-ROM.

Various embodiments have been described here, but do not limit the present invention. Various modifications can be applied to the present invention within the scope of the claims described below.

What is claimed is:

1. A laser processing device having a laser oscillator, a storage unit configured to store a processing program and processing conditions including an output condition of the laser oscillator, and a controller configured to issue a command to perform laser processing in accordance with the processing program, the laser processing device being configured to perform laser processing by irradiating a workpiece with a laser beam from the laser oscillator, the laser processing device comprising:
   a light quantity measuring unit configured to measure the light quantity of light reflected or emitted from a processing point irradiated with the laser beam from the laser oscillator;
   a first storage unit configured to store high output conditions, which are previously found by an experiment or calculation in accordance with at least some of the processing conditions and which include an irradiation intensity and irradiation time, at which the workpiece is melted, changed in shape, or denatured;
   a second storage unit configured to store low output conditions, which are previously found by an experiment or calculation in accordance with at least some of the processing conditions and which include the irradiation intensity and irradiation time, at which the workpiece is not melted, changed in shape, or denatured;
   a preprocessing controller which performs the following sequence steps:
   issues a first command to perform preprocessing of a the workpiece under the high output conditions, issues a second command to irradiate the workpiece with the laser beam from the laser oscillator under the low output conditions, issues a third command to measure a first light quantity measured by the light quantity measuring unit after the workpiece is irradiated with the laser beam from the laser oscillator under the low output conditions, issues a fourth command of whether to start the laser processing, based on the measured first light quantity, and the laser processing including at least one of piercing, cutting, welding, or marking of the workpiece.

2. The laser processing device according to claim 1, wherein the preprocessing controller further performs the following sequence of step: issues a fifth command to irradiate the workpiece with the laser beam from the laser oscillator under the low output conditions before issuing the first command and issues a sixth command to measure a second light quantity measured by the light quantity measuring unit after the workpiece is irradiated with the laser beam from the laser oscillator under the low output conditions, and wherein the fourth command includes a command of whether to start the laser processing, based on the measured first light quantity, the measured second light quantity, and a light quantity reference value by which whether to start the laser processing is determined.

3. The laser processing device according to claim 1, wherein the light quantity measuring unit is provided in the laser oscillator, and measures the light quantity of return light returned from the workpiece to the laser oscillator, and wherein the light quantity of return light measured by the light quantity measuring unit after the workpiece is irradiated with the laser beam from the laser oscillator under the high output conditions and the low output conditions is limited by a limit value specified to limit (a) the peak value of the intensity of the return light, (b) the average value of the intensity of the return light per predetermined time, (c) the number of times the peak value of the intensity of the return light exceeds a limit value within a predetermined time, or (d) the heat quantity of return light per pulse output.

4. The laser processing device according to claim 3, wherein the limit value of return light includes the limit value of the light quantity of return light and the limit value of the duration of return light, and wherein the limit value of the light quantity of return light in the high output conditions is greater than the limit value of the light quantity of return light in the low output conditions, and the limit value of the duration of return light in the high output conditions is smaller than the limit value of the duration of return light in the low output conditions.

* * * * *